(12) United States Patent
Oiwa et al.

(10) Patent No.: US 12,011,669 B2
(45) Date of Patent: Jun. 18, 2024

(54) INFORMATION PROCESSING DEVICE AND CHATTING METHOD

(71) Applicant: SONY INTERACTIVE ENTERTAINMENT INC., Tokyo (JP)

(72) Inventors: Takuma Oiwa, Tokyo (JP); Masashi Takeuchi, Tokyo (JP); Tatsuaki Hashimoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/630,615

(22) PCT Filed: Aug. 13, 2020

(86) PCT No.: PCT/JP2020/030761
§ 371 (c)(1),
(2) Date: Jan. 27, 2022

(87) PCT Pub. No.: WO2021/033618
PCT Pub. Date: Feb. 25, 2021

(65) Prior Publication Data
US 2022/0249961 A1    Aug. 11, 2022

(30) Foreign Application Priority Data
Aug. 20, 2019  (JP) .................. 2019-150594

(51) Int. Cl.
*A63F 13/87* (2014.01)
*A63F 13/30* (2014.01)
(Continued)

(52) U.S. Cl.
CPC .............. *A63F 13/87* (2014.09); *A63F 13/30* (2014.09); *H04L 51/046* (2013.01); *H04L 51/52* (2022.05)

(58) Field of Classification Search
CPC ........ H04L 51/046; H04L 51/52; A63F 13/87; A63F 13/30; G06F 13/00
See application file for complete search history.

(56) References Cited

U.S. PATENT DOCUMENTS 7,458,894 B2 * 12/2008 Danieli .................. A63F 13/35
463/42
7,945,620 B2 * 5/2011 Bou-Ghannam ... H04L 12/1822
709/204

(Continued)

FOREIGN PATENT DOCUMENTS

EP       1563675 A2 *  8/2005  ......... H04L 12/1822
JP    2002111679 A       4/2002
(Continued)

OTHER PUBLICATIONS

International Search Report and Written Opinion mailed Sep. 24, 2020, from PCT/JP2020/030761, 10 sheets.

(Continued)

*Primary Examiner* — Benjamin M Thieu
(74) *Attorney, Agent, or Firm* — XSENSUS LLP (57) ABSTRACT

A session management section 126 holds respective pieces of identification information of a plurality of members who join a session of an application. An allocation section 134 allocates a member to a chat group. A chat management section 114 acquires the identification information of each member who belongs to the chat group created in the session, and determines a member who becomes a partner for communicating chat data, for each member.

11 Claims, 10 Drawing Sheets

(51) Int. Cl.
*H04L 51/046* (2022.01)
*H04L 51/52* (2022.01)

(56) References Cited

U.S. PATENT DOCUMENTS

| | | | | |
|---|---|---|---|---|
| 8,006,191 | B1* | 8/2011 | Anderson | H04L 12/1827 |
| | | | | 715/753 |
| 9,281,952 | B2* | 3/2016 | Keohane | H04L 12/1822 |
| 9,681,099 | B1* | 6/2017 | Deets, Jr. | G06Q 10/10 |
| 9,687,746 | B2* | 6/2017 | Sullivan | A63F 13/35 |
| 10,293,260 | B1* | 5/2019 | Evans | A63F 13/424 |
| 2009/0228944 | A1* | 9/2009 | Bodlaender | H04L 12/1827 |
| | | | | 725/110 |
| 2011/0022450 | A1* | 1/2011 | Meredith | H04L 12/1813 |
| | | | | 715/758 |
| 2013/0123019 | A1* | 5/2013 | Sullivan | A63F 13/35 |
| | | | | 463/42 |
| 2016/0008722 | A1* | 1/2016 | Berger | A63F 13/795 |
| | | | | 463/31 |
| 2016/0121223 | A1 | 5/2016 | Kobayashi et al. | |
| 2018/0353866 | A1* | 12/2018 | Nakamura | A63F 13/77 |
| 2020/0338456 | A1* | 10/2020 | Atli | A63F 13/79 |
| 2023/0034686 | A1* | 2/2023 | Zheng | H04N 21/4753 |

FOREIGN PATENT DOCUMENTS

| | | |
|---|---|---|
| JP | 2014167517 A | 9/2014 |
| JP | 2015027369 A | 2/2015 |
| JP | 2015060287 A | 3/2015 |
| JP | 2015100372 A | 6/2015 |
| JP | 2019000220 A | 1/2019 |
| KR | 20170113146 A | 10/2017 |
| WO | 2011/102539 A1 | 8/2011 |

OTHER PUBLICATIONS

Notice of Reasons for Refusal drafted Feb. 21, 2023, from Japanese Patent Application No. 2019-150594, 3 sheets.
Notice of Reasons for Refusal dated Jun. 27, 2023, from Japanese Patent Application No. 2019-150594, 4 sheets.

* cited by examiner

INFORMATION PROCESSING DEVICE AND CHATTING METHOD

TECHNICAL FIELD

The present invention relates to a technique that causes users to chat with one another in a session generated by an application.

BACKGROUND ART

PTL 1 discloses a technique of displaying an invitation message to a game session on a display. A user accepts the invitation to the game session to join the game session.

CITATION LIST

Patent Literature

[PTL 1]
U.S. Patent Application Publication No. 2016/121223

SUMMARY

Technical Problem

In an online multiplayer game, a plurality of players join the same session and play the game together. Making it possible for the players to play the game while the players are chatting with one another makes the game much more interesting.

In view of this, an object of the present invention is to provide a technique for allowing users to chat with one another efficiently.

Solution to Problem

In order to solve the above problem, an information processing device according to an aspect of the present invention is an information processing device that executes an application, including a session management section that holds respective pieces of identification information of a plurality of members who join a session of the application, an allocation section that allocates a member to a chat group, and a chat management section that acquires the identification information of each member who belongs to the chat group created in the session to determine a member who becomes a partner for communicating chat data, for each member.

Another aspect of the present invention is a chatting method including a step of holding respective pieces of identification information of a plurality of members who join a session of an application, a step of allocating a member to a chat group, and a step of acquiring the identification information of each member who belongs to the chat group created in the session to determine a member who becomes a partner for communicating chat data, for each member.

Note that any combinations of the above constituent elements and expressions of the present disclosure as converted into methods, devices, systems, computer programs, and the like are also effective as aspects of the present disclosure.

DESCRIPTION OF EMBODIMENT

Figure 1:
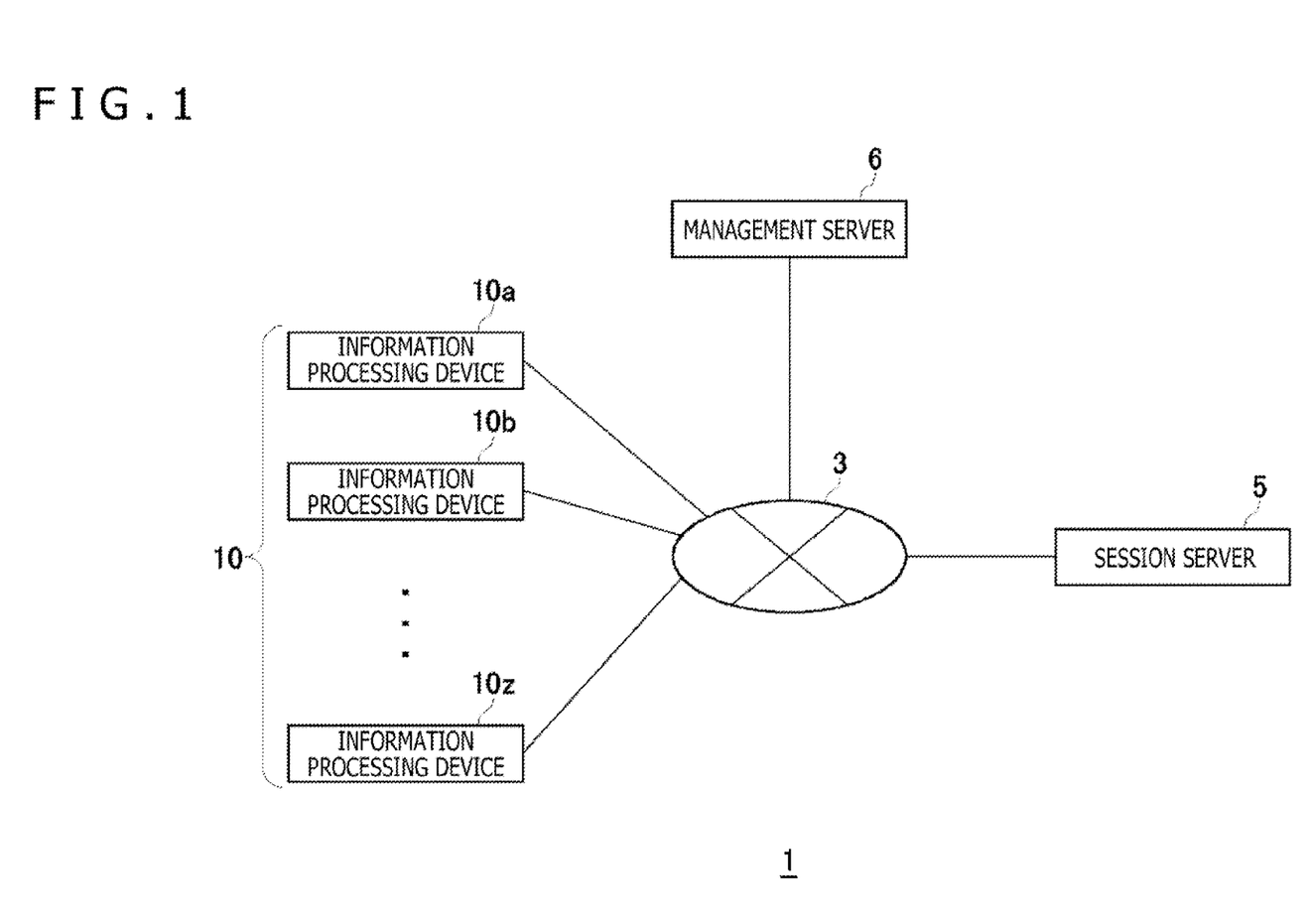
FIG. 1 is a diagram illustrating an information processing system according to an embodiment.

FIG. 1 is a diagram illustrating an information processing system 1 according to an embodiment. The information processing system 1 includes a session server 5, a management server 6, and a plurality of information processing devices 10a to 10z (hereinafter, referred to as an "information processing device 10" unless they are not particularly distinguished). The session server 5, the management server 6, and the information processing device 10 are connected with one another through a network 3 such as the Internet in a communicable manner.

The information processing device 10 includes system software and may be a game device that executes a game program. A user of the information processing device 10 operates an input device such as a game controller to input operation information regarding the game. In the embodiment, the user wears a headset for having a voice chat. In the information processing system 1, the user has a user account uniquely identifying the user him/herself and uses the user account to sign in to the management server 6, thereby using a service provided by the management server 6 and the session server 5.

The session server 5 manages a state of a session created by a game. The session server 5 manages such information regarding the session created by the game as a title of a game to be played, a user account of a member (session leader) who has created the session, a user account of a member who is joining the session, and a period of time for which the session is maintained. When there is a change in the state of the session, the system software of the information processing device 10 transmits the information indicating such a change to the session server 5, and the session server 5 manages the latest state of the session.

When one user A activates the game and selects a multiplayer mode of the game, the game creates a session regarding the game. Other user than the user A joins the session, so that the users can play the game on the session together and chat with each other.

There are a variety of methods by which other users than the user A join the session, and in a typical one, the user A sends an invitation to a user who is a friend of the user A and the friend accepts the invitation, so that the friend can join the session. Alternatively, even if other user does not receive an invitation, he/she sends a message wishing to join the session to the user A and is then allowed to join the session by the user A, and accordingly, he/she may be able to join the session.

Figure 2:
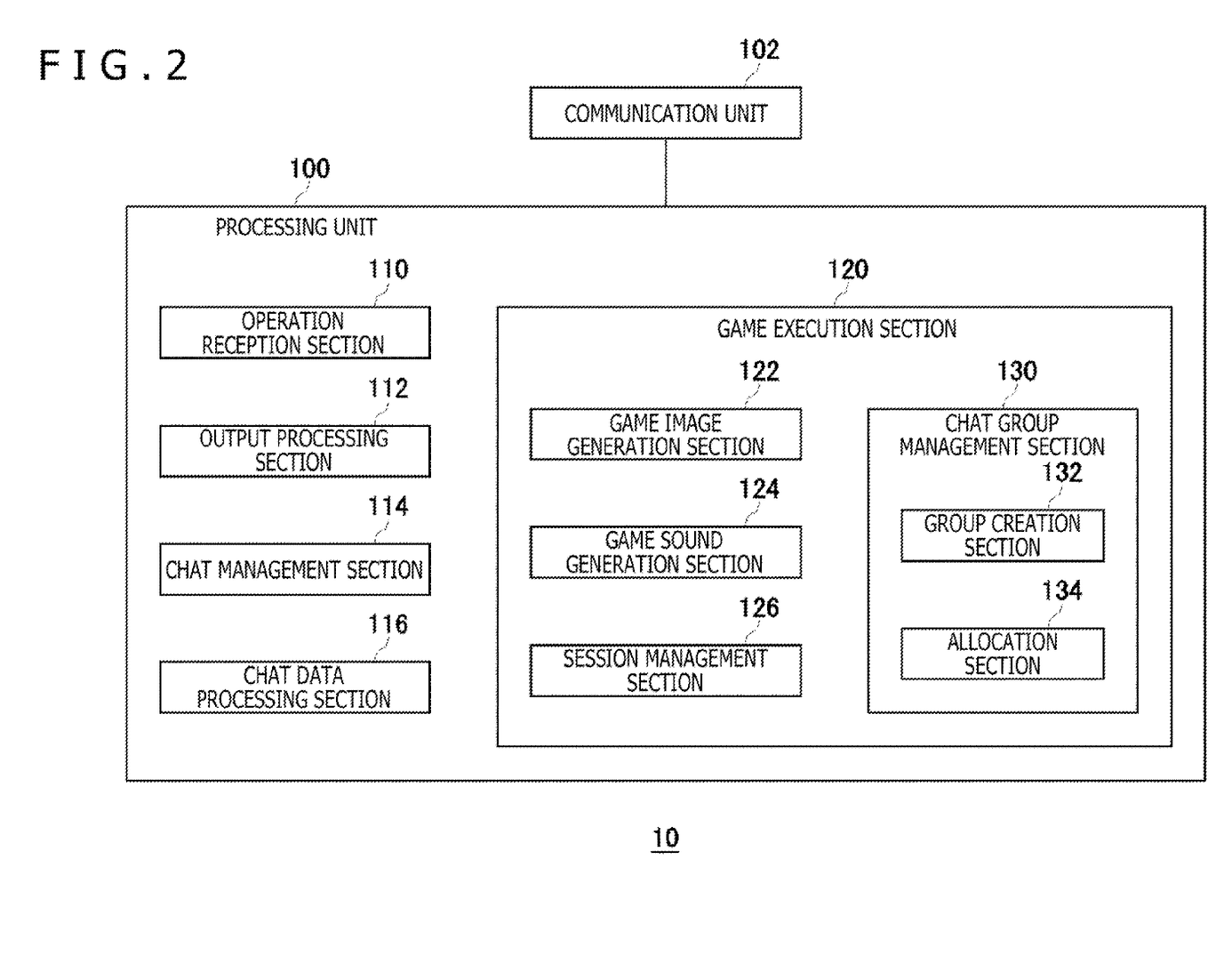
FIG. 2 is a diagram illustrating functional blocks of an information processing device.

FIG. 2 is a diagram illustrating functional blocks of an information processing device of the user A who creates a session. The information processing device 10 includes a processing unit 100 and a communication unit 102. The processing unit 100 includes an operation reception section 110, an output processing section 112, a chat management section 114, a chat data processing section 116, and a game execution section 120. The game execution section 120 includes a game image generation section 122, a game sound generation section 124, a session management section 126, and a chat group management section 130. The chat group management section 130 includes a group creation section 132 and an allocation section 134.

Constituent elements illustrated as functional blocks for performing various processes in FIG. 2 can be configured by hardware such as a circuit block, a memory, or other LSI (Large Scale Integration) or implemented by software such as system software or a game program loaded into the memory. Thus, it will be understood by those skilled in the art that these functional blocks can be implemented in various forms by hardware only, by software only, or by hardware and software in combination. The functional blocks are not limited to any of these.

The communication unit 102 receives operation information obtained by the user's operation on a button or the like of the input device and provides the operation information to the operation reception section 110. Also, the communication unit 102 communicates with the management server 6 and the session server 5 to exchange various pieces of information therewith. The communication unit 102 may function as both a wireless communication module and a wired communication module.

The operation reception section 110 receives operation information of the input device through the communication unit 102. In the embodiment, the game execution section 120 executes a game program and generates an image data and a sound data on the game. A function served as the game execution section 120 is implemented by system software, a game program, or hardware such as GPU (Graphics Processing Unit) that executes a rendering process or the like. Note that a game is an example of an application, and the game execution section 120 may execute an application other than a game.

During a gameplay by the user, the operation reception section 110 supplies the operation information of the input device to the game execution section 120, and the game image generation section 122 carries out computing processing that moves a player character in a virtual space, on the basis of the operation information. The game image generation section 122 includes a GPU and in response to the computing processing result in the virtual space, generates game image data from a viewpoint position (virtual camera) in the virtual space. The game sound generation section 124 generates game sound data from the viewpoint position in the virtual space. The output processing section 112 displays a game image on a display and outputs a game sound from the headset.

When the user A selects the multiplayer mode, the session management section 126 creates a session under such a condition that a connection environment with the network 3 is favorable, and notifies the session server 5 of session information including a user ID (Identification) of the user A, identification information (game ID) of the game, and the like. Note that the game has a menu item for explicitly "creating a session" prepared in advance, and when the user A selects the menu item, the session management section 126 may create a session.

When the session is created, the session server 5 returns identification information (session ID) of the session to the game, and manages a state of the session. In a case in which the user A allows the session to be opened, the session server 5 opens the session on the network 3, so that other user can find and join the session.

Figure 3:
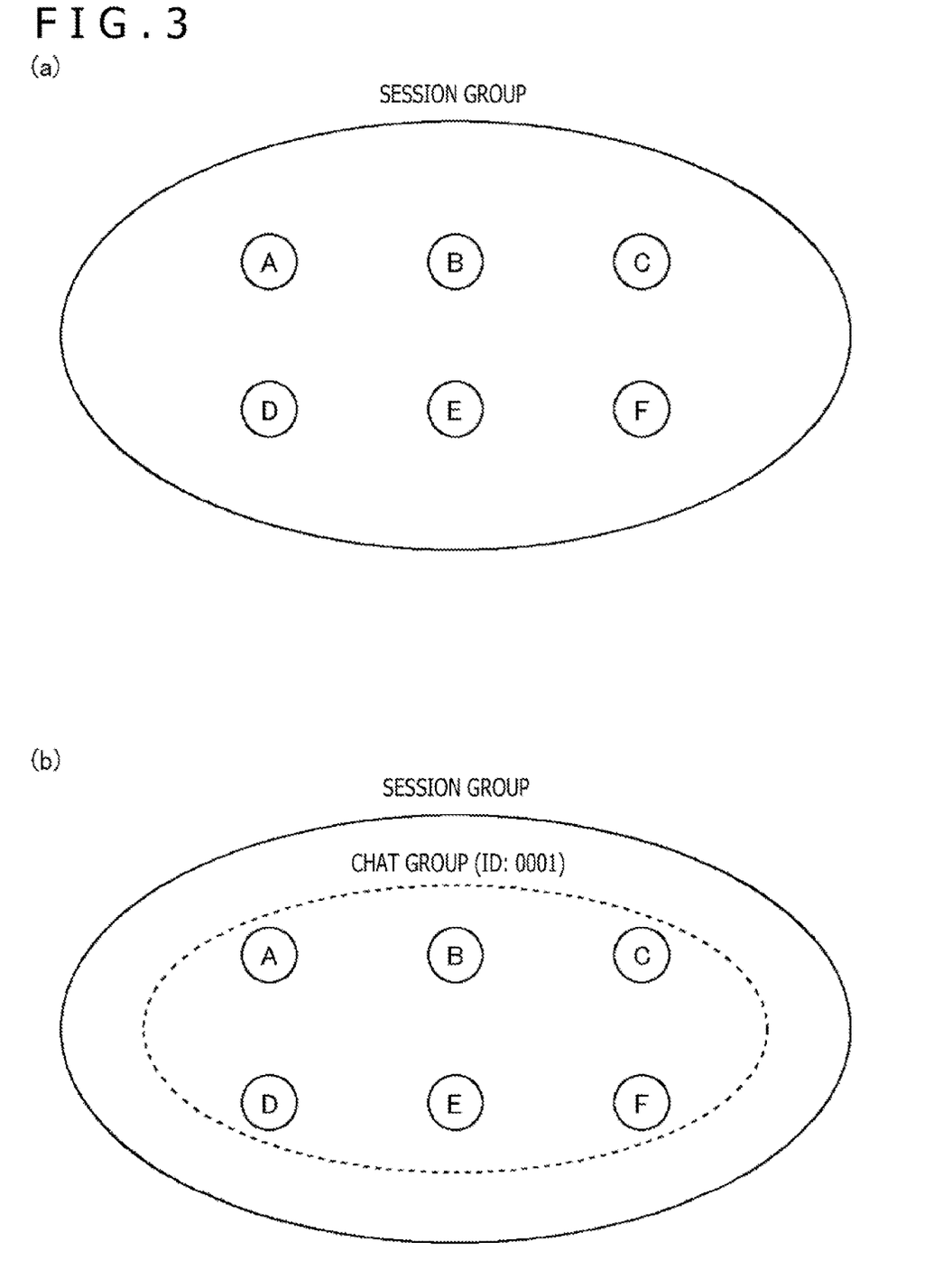
FIG. 3(a) depicts an example of a session group.
FIG. 3(b) depicts an example of a chat group.

FIG. 3(a) illustrates a state in which a plurality of users B, C, D, E, and F are joining the session created by the user A. The information processing devices 10 of the users A, B, C, D, E, and F are connected with one another in a P2P (Peer-to-Peer) communication. In the following description, a user who is joining the session is also referred to as a "member." The "member" includes the user A who is a session leader as well. The session management section 126 holds respective pieces of identification information (user IDs) of the plurality of users who join the session and manages the joining users as members of a session group. The user ID may be a user account and may be identification information different from the user account and may be an online ID which is used online, for example. The session management section 126 manages a member who newly joins the session or a member who leaves the session, and supplies the user IDs of all members constituting the session group to the chat management section 114. Accordingly, the chat management section 114 recognizes all the users who are joining the session.

FIG. 3(b) illustrates one example of a chat group. The group creation section 132 creates a chat group, and the allocation section 134 allocates all the members in the session group to the created chat group. The chat group is a set of members capable of chatting among the members who belong to the chat group. The group creation section 132 assigns identification information (group ID) for identifying the group to the chat group, and the chat group is thus distinguished depending on the assigned group ID.

In the example illustrated in FIG. 3(b), the chat group includes the same members as the session group, and the users A, B, C, D, E, and F belong to the chat group assigned the group ID "0001." The allocation section 134 supplies the user IDs of the members who belong to the chat group to the chat management section 114, along with the group ID. When there is a change in a configuration of the members who belong to the chat group, for example, in a case in which any one of the members leaves the chat room or a new member joins the chat room, the allocation section 134 supplies the user IDs after the configuration of the members who belong to the chat group has been changed, to the chat management section 114, along with the group ID.

The chat management section 114 is supplied with the user IDs of the members who are joining the session, from the session management section 126, and recognizes all the members who belong to the session group. In view of this, when acquiring the user IDs who belong to the chat group and the group ID from the allocation section 134, the chat management section 114 determines the member who becomes a communication partner to communicate chat data for each member.

Figure 4:
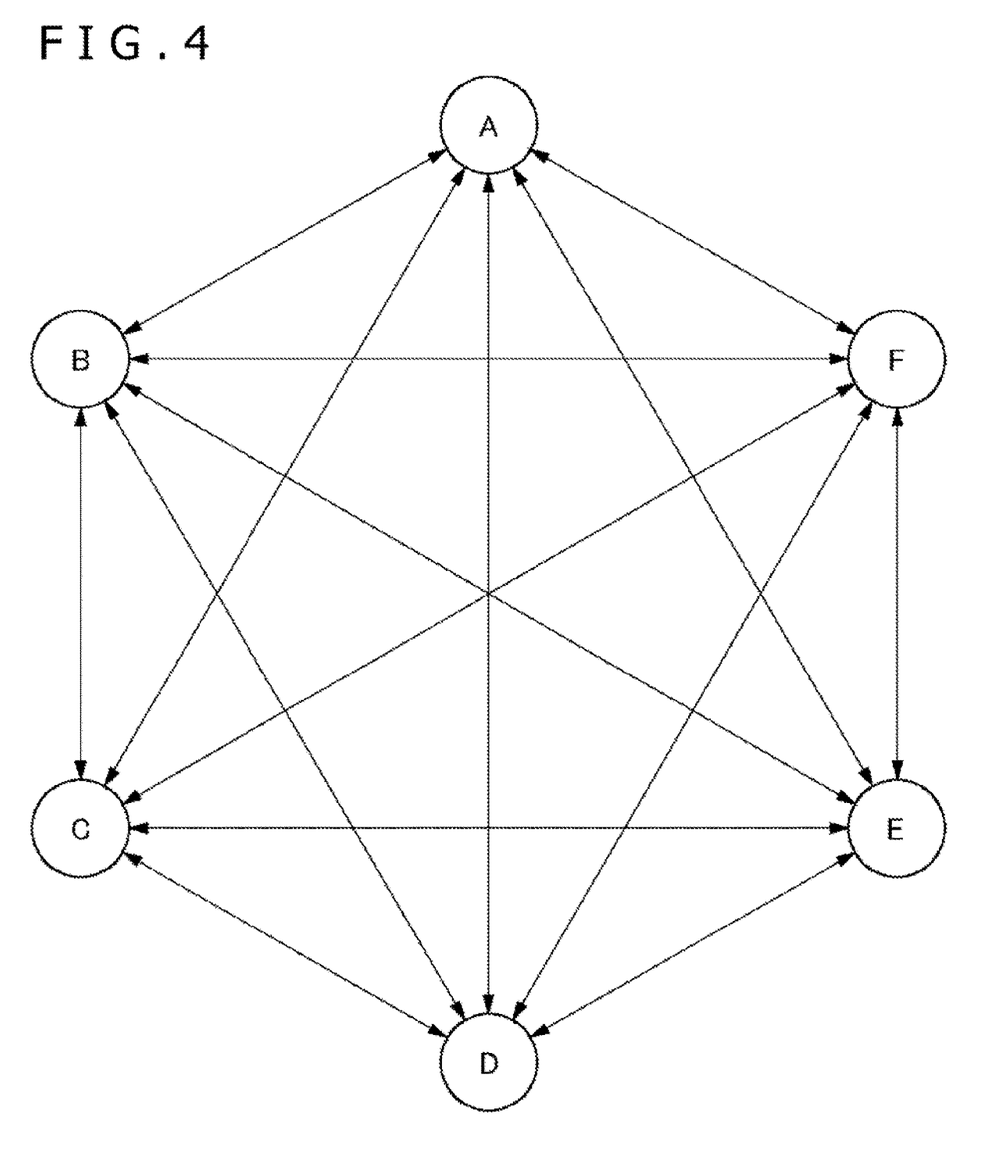
FIG. 4 is a diagram illustrating a chat partner determined for each member.

FIG. 4 illustrates a chat partner determined for each member. In FIG. 4, the members connected with a two-headed arrow mean that they are chat partners with each other. In the chat group assigned the group ID "0001," the users A, B, C, D, E, and F chat with one another, and accordingly, each member can chat with all other members in the group. Specifically, the users A, C, D, E, and F become a chat partner for the user B, and the A, B, D, E, and F become a chat partner for the user C.

The chat management section 114 notifies the information processing device 10 of each user of information for specifying a chat partner of each user (hereinafter, also referred to as "chat partner specifying information"). The chat partner specifying information may be a user ID of a member or may be a device ID of the information processing device 10 of a member. To be more specific, the information processing device 10 of the user B is notified of respective pieces of the chat partner specifying information of the users A, C, D, E, and F, and the information processing device 10 of the user B specifies the information processing device 10 of the member to which chat data is to be transmitted. Accordingly, the user B can chat with any member among the users A, C, D, E, and F. In the embodiment, a mode of chat is a voice chat, and the chat data is sound data spoken by the user; however, the mode of chat may be a text chat or a video chat.

The information processing device 10 of each user is provided with the chat data processing section 116, and the chat data processing section 116 transmits chat data (sound data) of each user, the chat data being input to a microphone incorporated in a headset, to the information processing device 10 of a corresponding chat partner, and receives chat data transmitted from the chat partner to supply the chat data to the output processing section 112. The output processing section 112 outputs the sound data of the chat partner from a headphone.

The allocation section 134 may allocate a member to a chat group, depending on a state of the member in a game. For example, it is assumed that a plurality of members in a session group are divided into two teams and play against each other. According to a user interface (UI) for team selection to be supplied by the game, the users A, B, and C select Team 1, and the users D, E, and F select Team 2. At this time, the group creation section 132 creates a chat group for Team 1 and a chat room for Team 2, while at the same time, deleting the chat group with the group ID "0001" which has been created.

Figure 5:
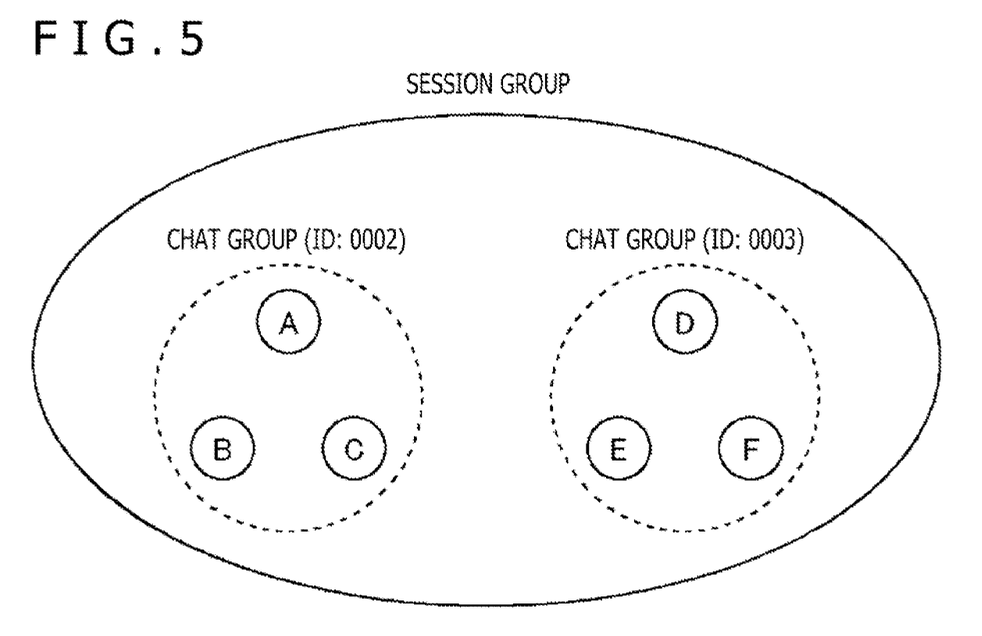
FIG. 5 is a diagram illustrating an example of chat groups.

FIG. 5 illustrates an example of the chat groups. At a time of team match, the group creation section 132 creates two chat groups, and the allocation section 134 allocates the users A, B, and C to the chat group with the group ID "0002" while allocating the users D, E, and F to the chat group with the group ID "0003." The allocation section 134 supplies the user IDs of the members who belong to the chat group which has been present at that point, to the chat management section 114, along with the group IDs. Specifically, the allocation section 134 supplies a combination of the user IDs of the users A, B, and C and the group ID "0002" and a combination of the user IDs of the users D, E, and F and the group ID "0003" to the chat management section 114. Since the chat group with the group ID "0001" has been deleted and is not present, the allocation section 134 does not supply the information regarding the members belonging to the group with the group ID "0001" to the chat management section 114.

When acquiring the combinations of the user IDs of the members belonging to the chat groups and the group IDs from the allocation section 134, the chat management section 114 determines a member who becomes a communication partner who communicates chat data for each member.

Figure 6:
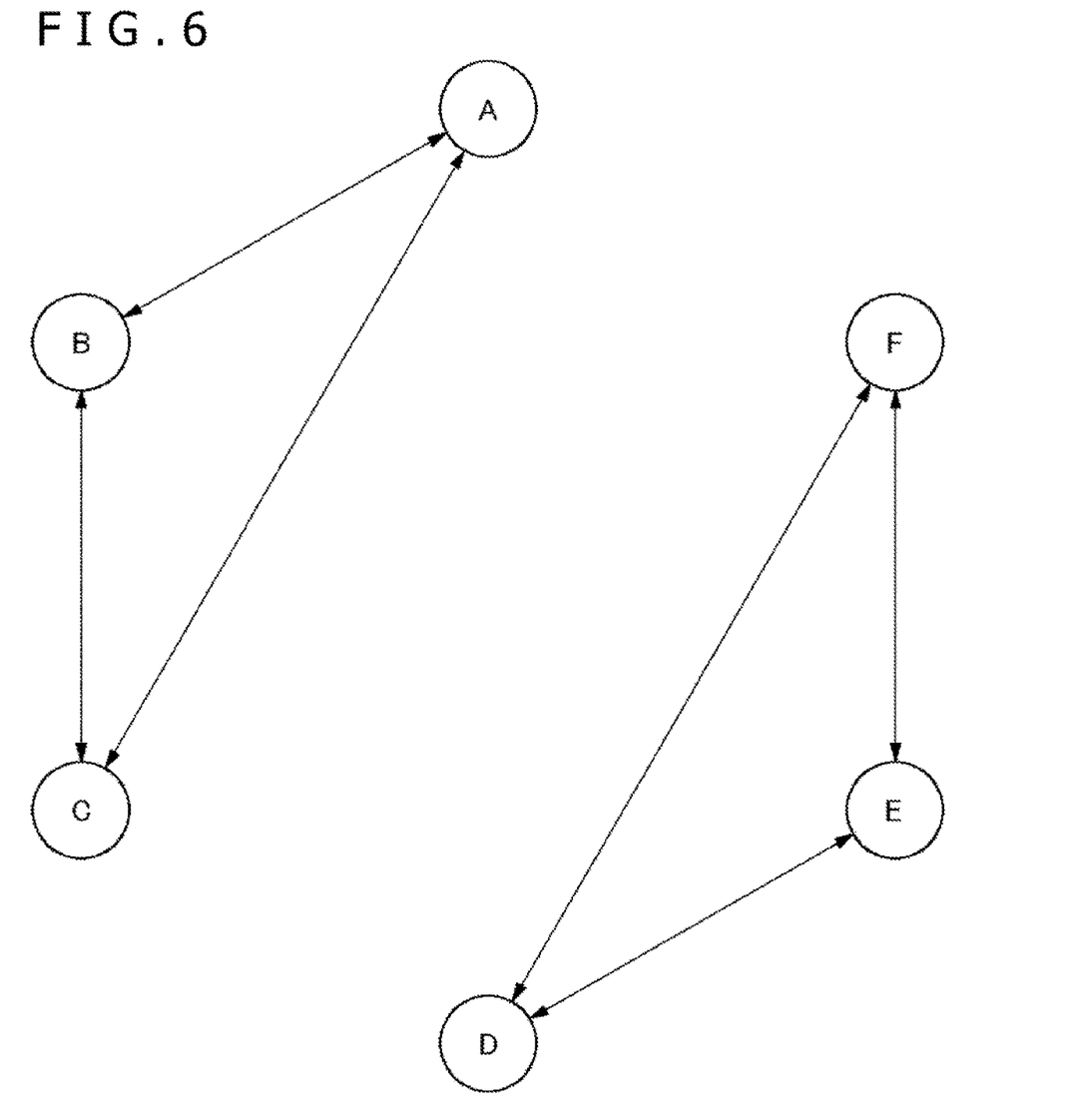
FIG. 6 is a diagram illustrating a chat partner determined for each member.

FIG. 6 illustrates a chat partner determined for each member. The members connected with a two-headed arrow mean that they are chat partners with each other. In the chat group with the group ID "0002," the users A, B, and C can chat with each other. In the chat group with the group ID "0003," the users D, E, and F can chat with each other.

The chat management section 114 notifies the information processing device 10 of each user of the chat partner specifying information regarding the chat partner of each user. In the example illustrated in FIG. 6, the chat management section 114 notifies the information processing device 10 of the user B of the respective pieces of chat partner specifying information of the users A and C, and the chat management section 114 notifies the information processing device 10 of the user C of the respective pieces of chat partner specifying information of the users A and B. In addition, the chat management section 114 notifies the information processing device 10 of the user D of the respective pieces of chat partner specifying information of the users E and F, notifies the information processing device 10 of the user E of the respective pieces of chat partner specifying information of the users D and F, and notifies the information processing device 10 of the user F of the respective pieces of chat partner specifying information of the users D and E. Accordingly, it is possible to divide the chat among the members in Team 1 and the chat among the members in Team 2.

In this manner, the chat group management section 130 can create the chat group according to a state of each member in the game and allocate each member to a chat group suitable for the state of each member. The chat group management section 130 dynamically allocates each member to a chat group suitable for each member, so that each member can play the game while enjoying chatting in an appropriate group depending on the state of each member.

Note that the chat group management section 130 may create a chat group according to a state of a character operated by a member, as a state of the member in the game and allocate the member to a chat group suitable for the state of the character.

Figure 7:
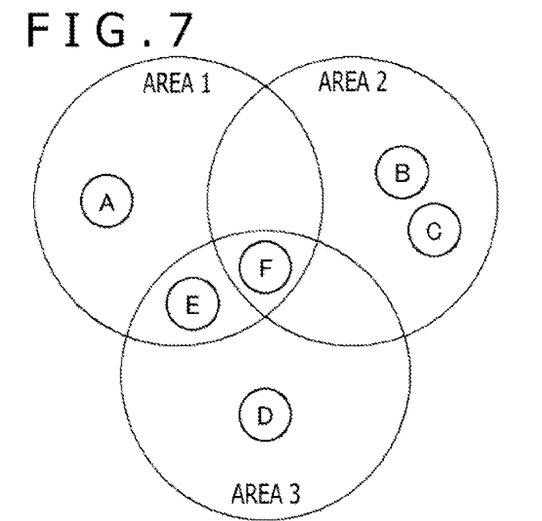
FIG. 7 is a diagram illustrating a position of each member in a game space.

FIG. 7 is another example of states of the members in the game, and illustrates a position of each member in the game space. The user A is located in an area 1, the users B and C are located in an area 2, the user D is located in an area 3, the user E is located in the areas 1 and 3, and the user F is located in the areas 1, 2, and 3.

In this example, the group creation section 132 creates a chat group for each area. In other words, the group creation section 132 creates a chat group for the area 1, a chat group for the area 2, and a chat group for the area 3. At the same time, if there has been other chat group, the group creation section 132 deletes the existing chat group.

Figure 8:
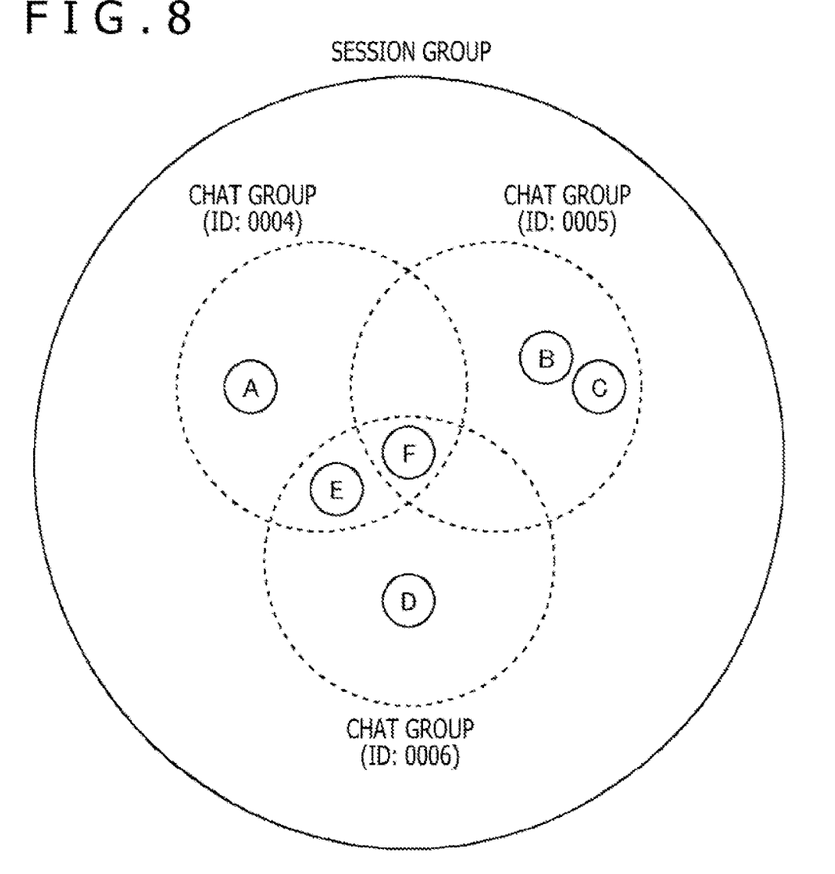
FIG. 8 is a diagram illustrating another example of the chat groups.

FIG. 8 illustrates another example of the chat groups. In a game environment illustrated in FIG. 7, the group creation section 132 creates a chat group for the area 1 (group ID "0004"), a chat group for the area 2 (group ID "0005"), and a chat group for the area 3 (group ID "0006"). The allocation section 134 allocates each member to the corresponding chat group according to the area in which each member is located.

The user A is allocated to the chat group with the group ID "0004."

The user B is allocated to the chat group with the group ID "0005."

The user C is allocated to the chat group with the group ID "0005."

The user D is allocated to the chat group with the group ID "0006."

The user E is allocated to the chat groups with the group IDs "0004" and "0006."

The user F is allocated to the chat groups with the group IDs "0004," "0005," and "0006."

As described above, it is possible to form the chat groups according to the position of each member in the game space.

The allocation section 134 supplies a combination of the user IDs of the users A, E, and F and the group ID "0004," a combination of the user IDs of the users B, C, and F and the group ID "0005," and a combination of the user IDs of the users D, E, and F and the group ID "0006," to the chat management section 114.

When acquiring the combinations of the user IDs and the group IDs of the members belonging to the chat groups from the allocation section 134, the chat management section 114 determines the member who becomes a partner for communicating chat data, for each member.

Figure 9:
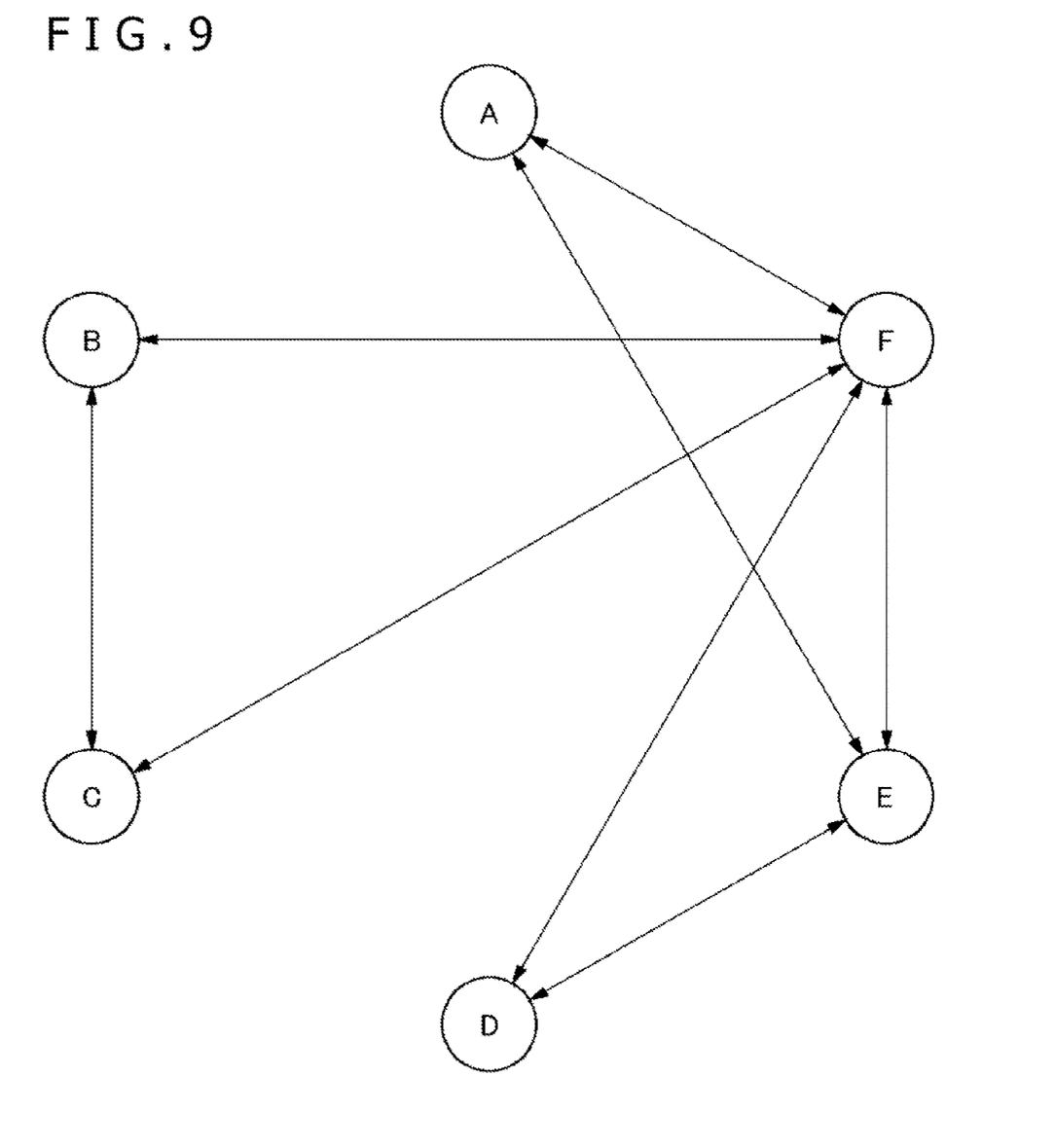
FIG. 9 is a diagram illustrating a chat partner determined for each member.

FIG. 9 illustrates a chat partner determined for each member. The members connected with a two-headed arrow mean that they are chat partners with each other. The chat management section 114 notifies the information processing device 10 of each user of the chat partner specifying information regarding the chat partner of each user. In the example illustrated in FIG. 9, the chat management section 114 notifies the information processing device 10 of the user B of the respective pieces of chat partner specifying information of the users C and F, notifies the information processing device 10 of the user C of the respective pieces of chat partner specifying information of the users B and F, and notifies the information processing device 10 of the user D of the respective pieces of chat partner specifying information of the users E and F. In addition, the chat management section 114 notifies the information processing device 10 of the user E of the respective pieces of chat partner specifying information of the users A, D, and F, and notifies the information processing device 10 of the user F of the respective pieces of chat partner specifying information of the users A, B, C, D, and E.

In this manner, the chat group management section 130 can create the chat groups according to the state of each member in the game and allocate each member to the chat group suitable for the state of each member. In this game, when the member moves between the areas, the chat group to which the member belongs is changed, so that the member can obtain new information from the other members through the chat.

As illustrated in FIG. 8, according to the information processing device 10 in the embodiment, the allocation section 134 can allocate a member to a plurality of chat groups. Since each of the users E and F belongs to the plurality of groups, the users E and F can obtain information regarding a plurality of areas from the other members at the same time. The chat group management section 130 manages the chat group according to a scenario of the game, making it possible to make the game much more interesting.

In the example described above, it is on the assumption that a communication direction of chat data between two members is bidirectional, the allocation section 134 may define the communication direction between two members. For example, the allocation section 134 may define the communication direction according to the state of the members in the game. In a team match in the game illustrated in FIG. 5, it is assumed that chat is used as a wireless communication tool between characters of the game. In a case in which all members in Team 1 can use the wireless communication tool, the users A, B, and C play in cooperation, communicating with one another via voice chat.

Due to fight or the like, transmitting means in the wireless communication tool of the user B is broken down, the user B is set so as not to be able to transmit chat data to the users A and C. Note that, if the user B can use receiving means, the user B can receive chat data from the users A and C. At this time, the allocation section 134 provides information indicating that transmission of chat data from the user B to the users A and C is not allowed, to the chat management section 114.

Figure 10:
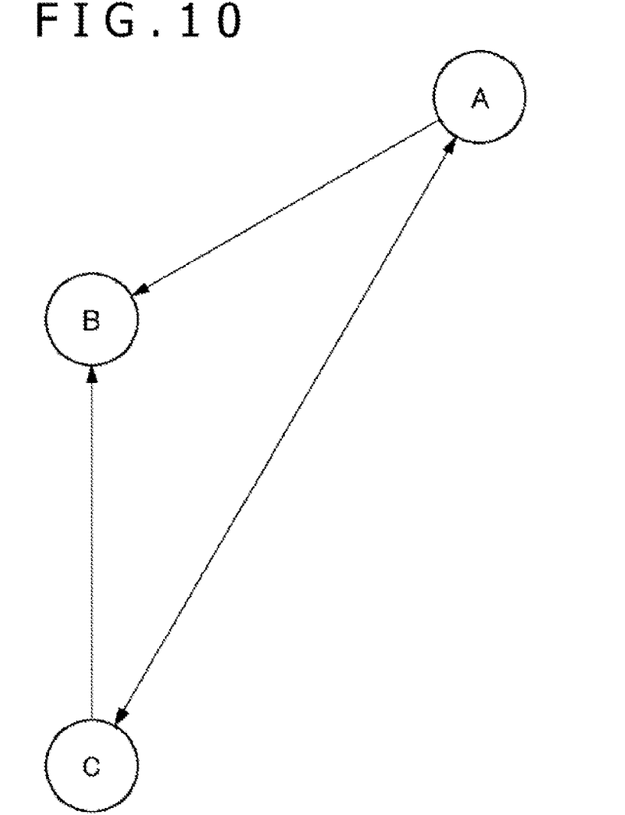
FIG. 10 is a diagram illustrating a chat partner determined for each member.

FIG. 10 illustrates a chat partner determined for each member. The members connected with a two-headed arrow mean that they are chat partners with each other, and the members connected with a one-headed arrow mean that they transmit only in a direction according to the direction indicated by the one-headed arrow.

At this time, the chat management section 114 notifies the information processing device 10 of the user B of the respective pieces of chat specifying information of the users A and C, while not allowing the user B to transmit chat data to the users A and C. Accordingly, it is possible to achieve a situation in which the wireless communication tool of the user B is broken down in a chat environment. Note that a scene in which the one-directional chat is adopted depends on a game, and to enhance a presentation effect, the game can appropriately use the one-directional chat.

In the foregoing description, it is on the assumption that the members in the chat group chat with one another, but the group creation section 132 may create a chat group making it possible to establish chat data communication among the different chat groups. For example, assumed is a case in which, among the users A, B, C, D, E, and F, the users A, B, C, and D become players who play the game and the users E and F become audiences who watch the game.

Figure 11:
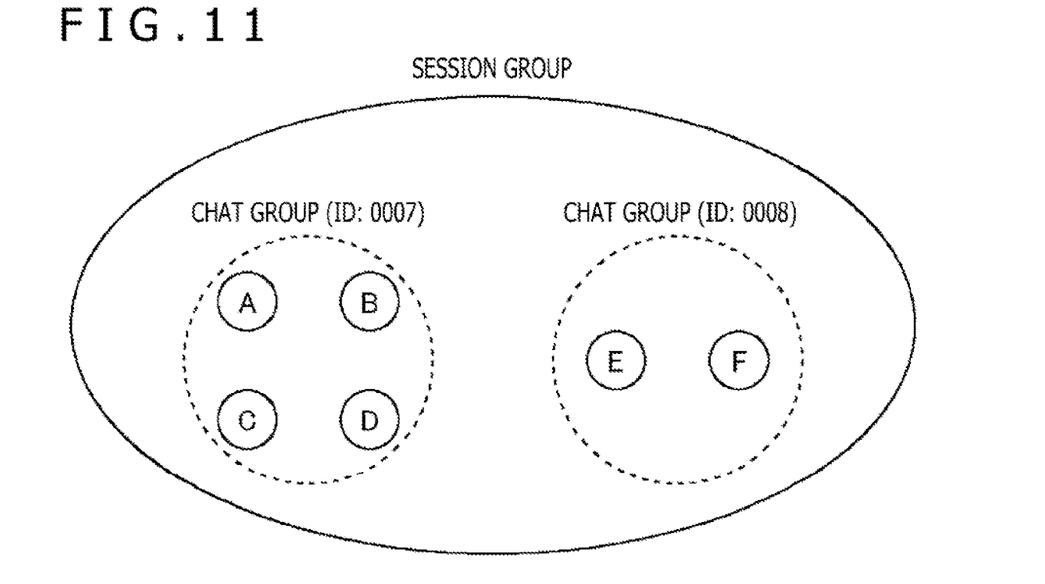
FIG. 11 is a diagram illustrating a further example of the chat groups.

FIG. 11 illustrates a further example of the chat groups. The group creation section 132 creates a chat group for players (group ID "0007") and a chat group for audience (group ID "0008"). As described above, the members belonging to each chat group can chat with one another, and in the example illustrated in FIG. 11, it is possible to communicate chat data among the two chat groups.

In this example, it is intended that, while the users E and F who watch the game are allowed to hear voice chat between the players, the players are not allowed to hear voice chat between the audience users E and F. In other words, the group creation section 132 creates the chat group for players and the chat group for audience such that the chat data between the members belonging to the chat group for players is provided to the members belonging to the chat group for audience and the chat data between the members belonging to the chat group for audience is not provided to the members belonging to the chat group for players. Information regarding a direction of this communication between the groups is provided to the chat management section 114.

Figure 12:
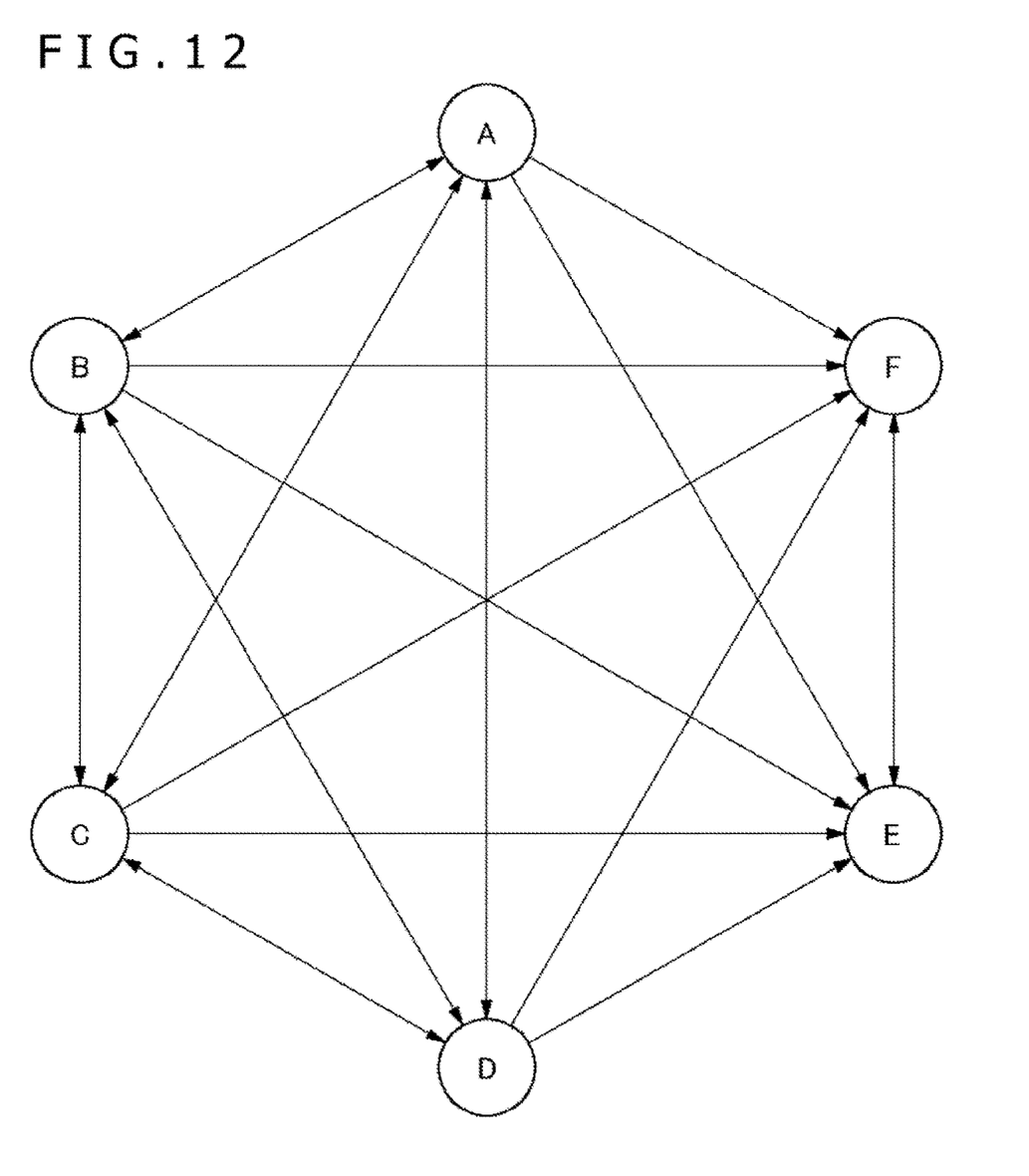
FIG. 12 is a diagram illustrating a chat partner determined for each member.

FIG. 12 illustrates a chat partner determined for each member. The members connected with a two-headed arrow mean that the members are chat partners with each other, and the members connected with a one-headed arrow mean that transmission only according to the direction of the one-headed arrow is possible.

As illustrated in FIG. 12, the information processing devices 10 of the users A, B, C, and D transmit chat data also to the information processing devices 10 of the users E and F belonging to the different chat group. In this manner, making it possible to communicate chat data between the chat groups allows for flexible operation of chat control.

The present disclosure has been described above on the basis of embodiment thereof. The foregoing embodiment is illustrative, and it is to be understood by those skilled in the art that combinations of constituent elements and processing processes of the embodiments are susceptible of various modifications and that such modifications also fall within the scope of the present disclosure. In the embodiment, the game execution section 120 may execute an application other than a game.

In the embodiment, a description has been given in which the chat data processing section 116 of each of the information processing devices 10 exchanges chat data through the P2P communication; however, a chat server may manage transmission/reception of chat data among the information processing devices 10. In this case, the chat management section 114 provides the chat partner specifying information of each user to the chat server, and each of the information processing devices 10 transmits chat data of the own user to the chat server. The chat server distributes the chat data according to the chat partner specifying information, to each of the information processing devices 10, thereby achieving an environment in which the user chats only with a specific chat partner.

In the embodiment, the chat management section 114 is implemented by system software. In a modification example, the chat management section 114 may be implemented by a game program or by another application.

In the embodiment, a description has been given in which the chat management section 114 notifies the information processing device 10 of each user of the chat partner specifying information, the chat data processing section 116 in the information processing device 10 of each user transmits the chat data (sound data) of the own user to the information processing device 10 of the chat partner, and receives the chat data transmitted from the chat partner to supply the received chat data to the output processing section 112. In the modification example, when the chat management section 114 notifies the information processing device 10 of each user of the chat partner specifying information, the chat data processing section 116 in each of the information processing devices 10 may transmit the chat data of the own user to the information processing devices 10 of all members (excluding the own user) who are joining the session. At this time, the chat data processing section 116 in each of the information processing devices 10 receives the chat data transmitted from the chat partner and supplies the received chat data to the output processing section 112, while the chat data processing section 116 in each of the information processing devices 10 does not supply the chat data transmitted from a user who is not the chat partner of the own user to the output processing section 112. In this manner, mute setting is made for the chat data from the user who is not the chat partner of the own user, thereby achieving an environment in which the user chats with the chat partner only.

INDUSTRIAL APPLICABILITY

The present invention can be applied to the technical field in which users can chat with each other.

REFERENCE SIGNS LIST

1: Information processing system
10: Information processing device
100: Processing unit
102: Communication unit
110: Operation reception section
112: Output processing section
114: Chat management section
120: Game execution section
122: Game image generation section
124: Game sound generation section
126: Session management section
130: Chat group management section
132: Group creation section
134: Allocation section

The invention claimed is:

1. An information processing device that executes an application, comprising:
   processing circuitry configured to
     hold respective pieces of identification information of a plurality of members who join a session of the application;
     allocate a member to a chat group; and
     acquire the identification information of each member who belongs to the chat group created in the session to determine a member who becomes a partner for communicating chat data, for each member, wherein
   the application includes a game space where each of the plurality of members can move to change a position within the game space,
   the processing circuitry simultaneously allocates a member of the plurality of members to a plurality of chat groups, and
   the processing circuitry allocates the member to the chat group, according to a current area of the member in the game space in the application,
   wherein the game space includes a plurality of areas, each of the plurality of areas corresponding to each of the plurality of chat groups, and the processing circuitry allocates the member to at least one of the plurality of chat groups corresponding to the current area of the member in the game space in the application, and
   wherein at least a first area and a second area of the plurality of areas in the game space overlap with each other, the first area corresponding to a first chat group of the plurality of chat groups, the second area corresponding to a second chat group of the plurality of chat groups, and the processing circuitry allocates the member to both the first chat group and the second chat group in a case where the current area of the member is an area where the first area and the second area overlap.

2. The information processing device according to claim 1, wherein
   the processing circuitry defines a direction of communication between two users.

3. The information processing device according to claim 1, wherein
   the processing circuitry is further configured to:
     create the plurality of chat groups that make it possible to communicate chat data between two chat groups.

4. The information processing device according to claim 3, wherein
   the processing circuitry creates a first chat group and a second chat group such that chat data of a member who belongs to the first chat group is provided to a member who belongs to the second chat group and chat data of the member who belongs to the second chat group is not provided to the member who belongs to the first chat group.

5. The information processing device according to claim 1, wherein
   the processing circuitry creates a first chat group for a first area in the game space, and
   the processing circuitry creates a second chat group for a second area in the game space.

6. The information processing device according to claim 5, wherein
the member belongs to the first area and the second area in the game space, and
the processing circuitry allocates the member to both the first chat group and the second chat group.

7. The information processing device according to claim 6, wherein
the processing circuitry allow the member to communicate chat data with a second member in the first chat group and a third member in the second chat group.

8. The information processing device according to claim 1, wherein
the application is a game of team match.

9. The information processing device according to claim 8, wherein
the processing circuitry is configured to create a chat group for players of the team match and a chat group for audience of the team match.

10. A chatting method comprising:
holding respective pieces of identification information of a plurality of members who join a session of an application;
simultaneously allocating a member of the plurality of members to a plurality of chat groups; and
acquiring the identification information of each member who belongs to the plurality of chat groups created in the session to determine a member who becomes a partner for communicating chat data between the plurality of chat groups, wherein
the application includes a game space where each of a plurality of members can move to change a position within the game space,
the method further comprises allocating the member to the chat group, according to a current area of the member in the game space in the application,
wherein the game space includes a plurality of areas, each of the plurality of areas corresponding to each of the plurality of chat aromas, and the method further allocates the member to at least one of the plurality of chat groups corresponding to the current area of the member in the game space in the application, and
wherein at least a first area and a second area of the plurality of areas in the game space overlap with each other, the first area corresponding to a first chat group of the plurality of chat groups, the second area corresponding to a second chat group of the plurality of chat groups, and the method further allocates the member to both the first chat group and the second chat group in a case where the current area of the member is an area where the first area and the second area overlap.

11. A non-transitory computer readable medium including executable instructions, which when executed by a computer cause the computer to execute a chatting method, the method comprising:
causing a storage device to hold respective pieces of identification information of a plurality of members who join a session of an application, the application including a game space where each of the plurality of members can move to change a position within the game space;
allocating a member of the plurality of members to a chat group, according to a current area of the member in the game space in the application;
outputting the identification information of the member who belongs to the chat group; and
creating another chat group in which members of a first chat group can communicate with members of a second chat group,
wherein the game space includes a plurality of areas, each of the plurality of areas corresponding to each of a plurality of chat groups, and allocates the member to at least one of the plurality of chat groups corresponding to the current area of the member in the game space in the application, and
wherein at least a first area and a second area of the plurality of areas in the game space overlap with each other, the first area corresponding to the first chat group of the plurality of chat groups, the second area corresponding to the second chat group of the plurality of chat groups, and allocates the member to both the first chat group and the second chat group in a case where the current area of the member is an area where the first area and the second area overlap.

* * * * *